March 23, 1965  D. F. BROWNE  3,174,459
BIRD FEEDER
Filed Jan. 27, 1964  2 Sheets-Sheet 2
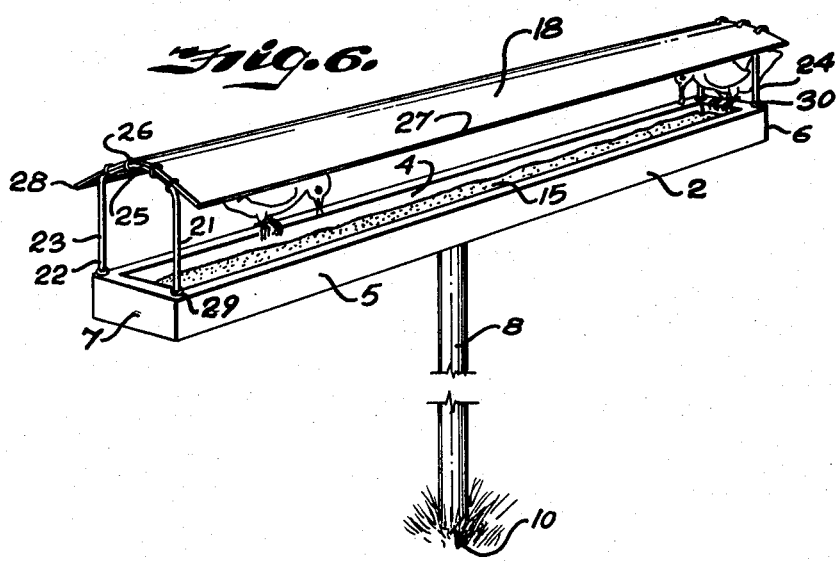
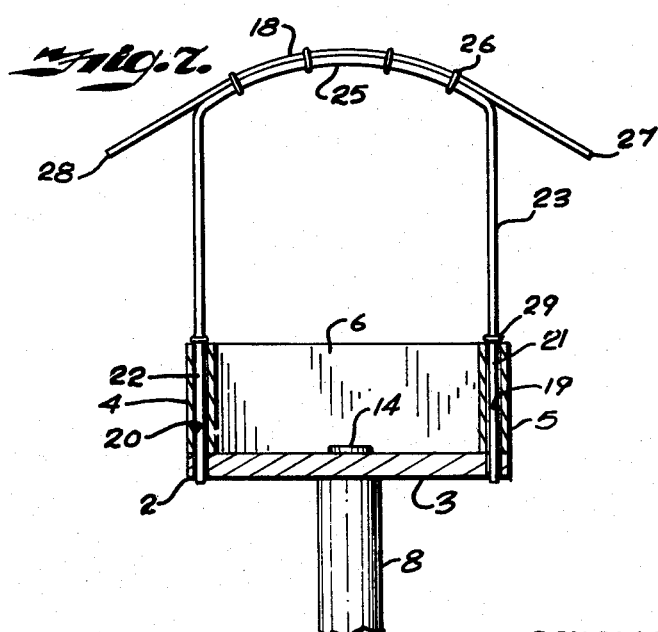
INVENTOR.
DOUGLAS F. BROWNE
BY
Fishburn & Gold
ATTORNEYS 3,174,459
BIRD FEEDER
Douglas F. Browne, 1220 W. 69th Terrace,
Kansas City, Mo.
Filed Jan. 27, 1964, Ser. No. 340,195
8 Claims. (Cl. 119—51)

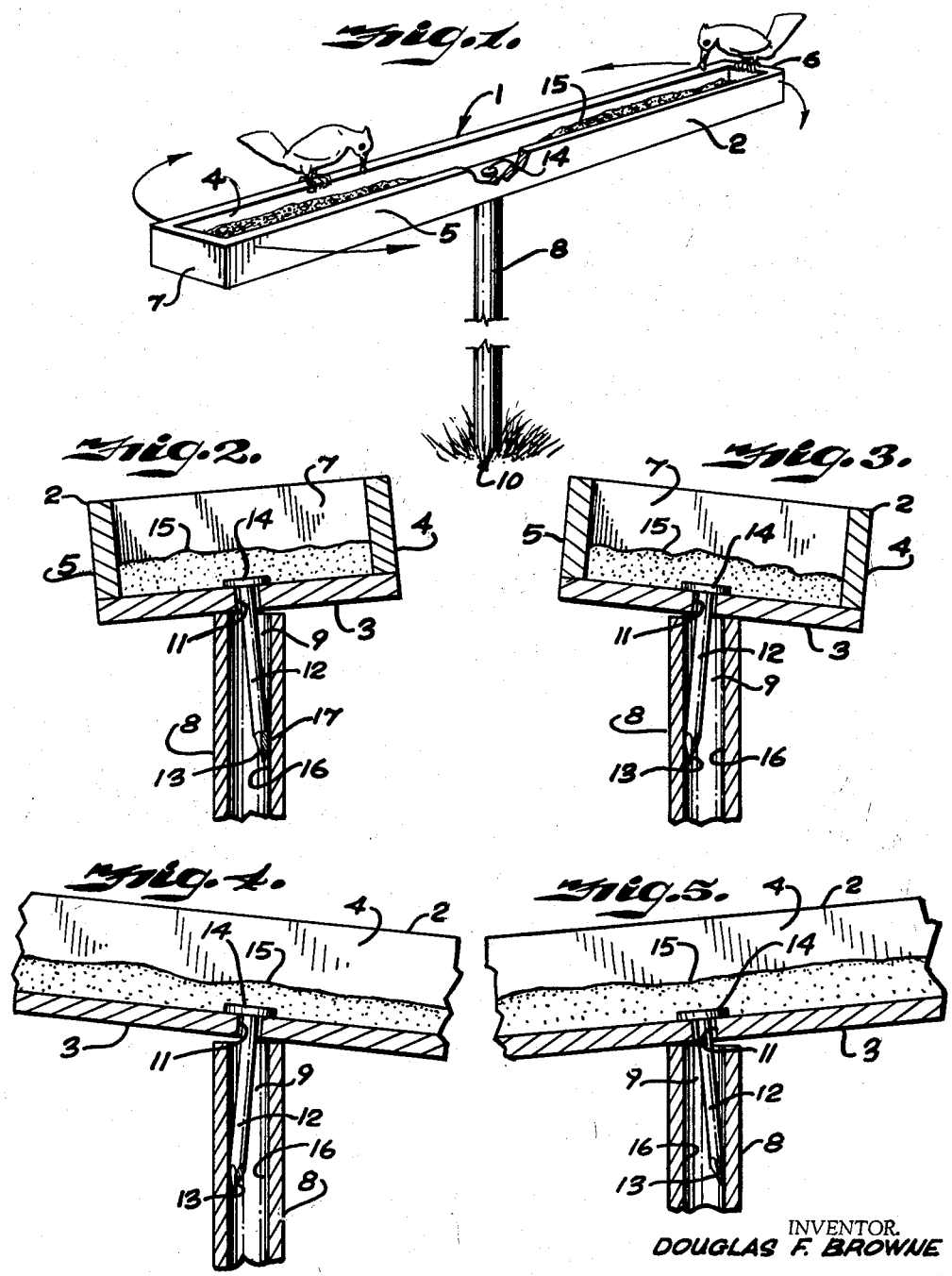

This invention relates to improvements in bird feeders, and more particularly to a revolving teeter or seesaw type feeder.

Heretofore, various types of bird feeders have been devised, some of revolving type, but so far as applicant is aware no one has devised a bird feeder of a teeter or seesaw type wherein a bird, by lighting on one end of the feeder, will cause that end to move downwardly until a bird or birds of greater weight landing on the other end will raise the first-mentioned end of the feeder.

The principal objects of the present invention are to provide a simple feeder wherein a trough-like container is provided for supporting on a support, such as a post or the like, having one end supported in the ground and the end above the ground and having a tubular portion at the upper end thereof and wherein a pin or the like is inserted through the bottom of the trough and has its elongated part extending into the tubular part of the support to retain the trough on the support and whereby the trough will rock longitudinally and sideways of the support.

Other objects of the present invention are to provide an elongated trough portion or container for the feed wherein the bottom of the trough rests on top of a tubular support and the bottom at substantially the center thereof is provided with an opening adapted to receive a pin or shaft having a head thereon and wherein the pin extends into the hollow upper end of the support so that the lower end of the shaft, when the trough tilts or teeters longitudinally or sidewise, will engage against the inside wall of the tubular support oppositely the direction from which the trough is tilting and retain the trough on the support.

A still further object of the present invention is to provide the trough with a removable cover to protect the feed from the elements.

Other objects and advantages of this invention will become apparent from the following description taken in connection with the accompanying drawings wherein are set forth by way of illustration and example certain embodiments of this invention.

FIG. 1 is a perspective view of my bird feeder with one side of the trough broken away to illustrate the head of the pin for supporting the trough on the support.

FIG. 2 is an enlarged fragmentary cross-sectional view through the trough and support showing the trough tilted sideways to the left.

FIG. 3 is an enlarged fragmentary cross-sectional view through the trough and support showing the trough tilted sideways to the right.

FIG. 4 is a longitudinal fragmentary cross-sectional view through the trough and support showing the elongated trough tilted to the right.

FIG. 5 is a longitudinal fragmentary cross-sectional view through the elongated trough and support showing the trough tilted to the left.

FIG. 6 is a perspective view of the trough showing a removable cover thereon.

FIG. 7 is an enlarged cross-sectional view particularly illustrating the removable cover.

Referring more in detail to the drawings:

1 designates a bird feeder embodying the features of my invention comprising a trough-like container 2 having a bottom 3, sides 4 and 5, and ends 6 and 7. A support 8 is provided for the trough and is here illustrated to be of tubular construction having an opening 9 in the top thereof and its lower end embedded in the ground as indicated at 10.

The bottom 3 at substantially the longitudinal and transverse center thereof is provided with an opening 11 for receiving a connecting member 12 such as a pin or shaft having its lower end pointed as indicated at 13 and a head 14 on its upper end. Feed is indicated at 15 in the trough 2.

The trough 2, as well as the support or post 8, may be made of wood, metal, plastic, or other suitable material. The post 8 does not necessarily need to be hollow throughout but the upper end thereof must be bored to a depth greater than the length of the shaft or nail 12 in order to receive the shaft.

The trough is retained on the support by the shank or point portion 13 of the shaft 12 engaging against the inside wall 16 of the support. For instance, in FIG. 2, the trough 2 is shown tilted transversely to the left and the point 13 of the shaft engages against the inside wall 16 as indicated at 17 to prevent the trough from falling or being disengaged from the support and also to limit tipping transversely of the trough. In FIG. 3, the trough is shown tilted to the right.

In FIG. 4, the trough is shown in longitudinally tipped position or in what is generally termed a seesaw position with the right end of the trough shown in lowered position and in FIG. 5 the left end of the trough is shown in the low position.

I have found in use that the teeter or seesaw element of the feeder is very attractive to the birds. I have also found that birds preferably will feed from this type of feeder over the ordinary closed top type of feeder; apparently, because the birds are more out in the open and are not likely to be surprised by animals or other objects getting too close to them. Apparently, the birds also like the revolving or rotating movement caused by the wind, as well as the teeter or seesaw action, of the feeder. I have further found that squirrels will not bother the feed in the feeder and cats do not bother the birds while feeding.

In FIGS. 6 and 7, I have illustrated a cover 18 for the trough 2. In order to support the cover, I provide the four corners of the trough with vertical openings as indicated at 19 and 20 (FIG. 7) and adapted to engage in the openings 19 and 20 at each end of the trough are shanks 21 and 22 of U-shaped members 23 and 24. The upper ends of the U-shaped members are rounded as indicated at 25 and secured thereto by fastening devices such as wire loops or the like 26 is an elongated cover 18 having edges 27 and 28 extending over the sides 4 and 5 of the trough 2. The legs of the U-shaped members 23 and 24 are provided with enlarged portions or collars 29 and 30 which engage the top of the trough around the openings 19 and 20 to hold the cover in place.

It will be obvious from the foregoing that I have provided an improved bird feeder wherein the trough or container portion for the feed will be supported on a hollow support and the pin in the center thereof retains the trough thereon and allows the same to rotate, teeter or seesaw with respect to the support.

The tubular support 8 may be approximately one-half inch in diameter and any desired length above ground, preferably three to five feet. The trough may be approximately two to three feet long, two to three inches wide and one to two inches in depth, these dimensions being suggestive only.

It is to be understood that while I have illustrated and described one form of this invention, it is not to be limited to the specific form or arrangement of parts herein described and shown except insofar as such limitations are included in the claims.

What I claim and desire to secure by Letters Patent is:

1. A feeder adapted to be supported by the ground where birds feed comprising,
   (a) an elongated trough having a bottom for containing feed,
   (b) a tubular support for said trough, said support having one end driven into said ground and its other open end extending thereabove and said bottom of said trough resting on said other open end of the support, and
   (c) means interacting between the bottom of said trough and said open end of said support so that said trough will teeter longitudinally and transversely with respect to said support.

2. A bird feeder comprising,
   (a) a trough having a bottom for containing feed, said bottom of the trough having an opening in the longitudinal center thereof,
   (b) a vertically extending support for said trough, said support having a longitudinal bore opening adjacent the bottom of said trough,
   (c) a pin having a head and a shank portion, said shank portion extending through said opening in the bottom of the trough and into said bore, the free end of the pin engaging against the wall of said bore to retain the trough on said support and so that said trough will teeter with respect to said support.

3. A bird feeder comprising,
   (a) a trough having a bottom for containing feed, said bottom of the trough having an opening in the longitudinal center thereof,
   (b) a vertically extending support for said trough, said support having a longitudinal bore opening in its upper end and said upper end engaging the underside of the bottom of said trough,
   (c) a pin having a head and a shank portion, said shank portion extending through said opening in the bottom of the trough and into said bore, the free end of the pin engaging against the wall of said bore to retain the trough on said support and so that said trough will teeter longitudinally and transversely with respect to said support.

4. A bird feeder comprising,
   (a) a tubular, vertically extending support having an upper end,
   (b) an elongated trough for containing feed engaging on and supported by the upper end of said tubular support, said trough having a bottom and said bottom having an opening in the center thereof,
   (c) an elongated pin having a head and a shank, said shank extending through said opening in said bottom of the trough and into said hollow support for retaining said trough on said support.

5. The combination of claim 3 including a cover for said trough.

6. The combination of claim 4 including a cover for said trough.

7. In combination with an elongated trough for containing feed for birds, said trough having a bottom and sides and end walls, said bottom having an opening near its longitudinal center, a tubular support member having an upper end, the underside of said bottom of said trough surrounding the opening therein resting on said upper end of said support member, and a pin having a head engaging the upper side of the bottom of the trough and a shank portion extending through said opening in said bottom and having its free end extending into the upper end of said tubular support, the inside transverse dimension of the tubular support being greater than the outside transverse dimension of said pin, whereby said trough will be retained on said support and tilt in any direction with respect to said support.

8. In combination with an elongated trough for containing feed for birds, said trough having a bottom and having an opening near its longitudinal center, a tubular support member having an upper end, the underside of said bottom of said trough surrounding the opening therein resting on said upper end of said support member, and a pin having a head engaging the upper side of the bottom of the trough and a shank portion extending through said opening in said bottom and having its free end extending into the upper end of said tubular support for retaining said trough on said support.

References Cited by the Examiner

UNITED STATES PATENTS

| | | | |
|---|---|---|---|
| 2,682,255 | 6/54 | Kleeman | 119—51 |
| 3,083,687 | 4/63 | Slaven | 119—51 |
| 3,086,499 | 4/63 | Dilley | 119—51 |

SAMUEL KOREN, *Primary Examiner.*

HUGH R. CHAMBLEE, *Examiner.*